July 28, 1959     E. E. GOODALE     2,897,445
TIME SERIES CURRENT CONVERSION
Filed Aug. 9, 1957
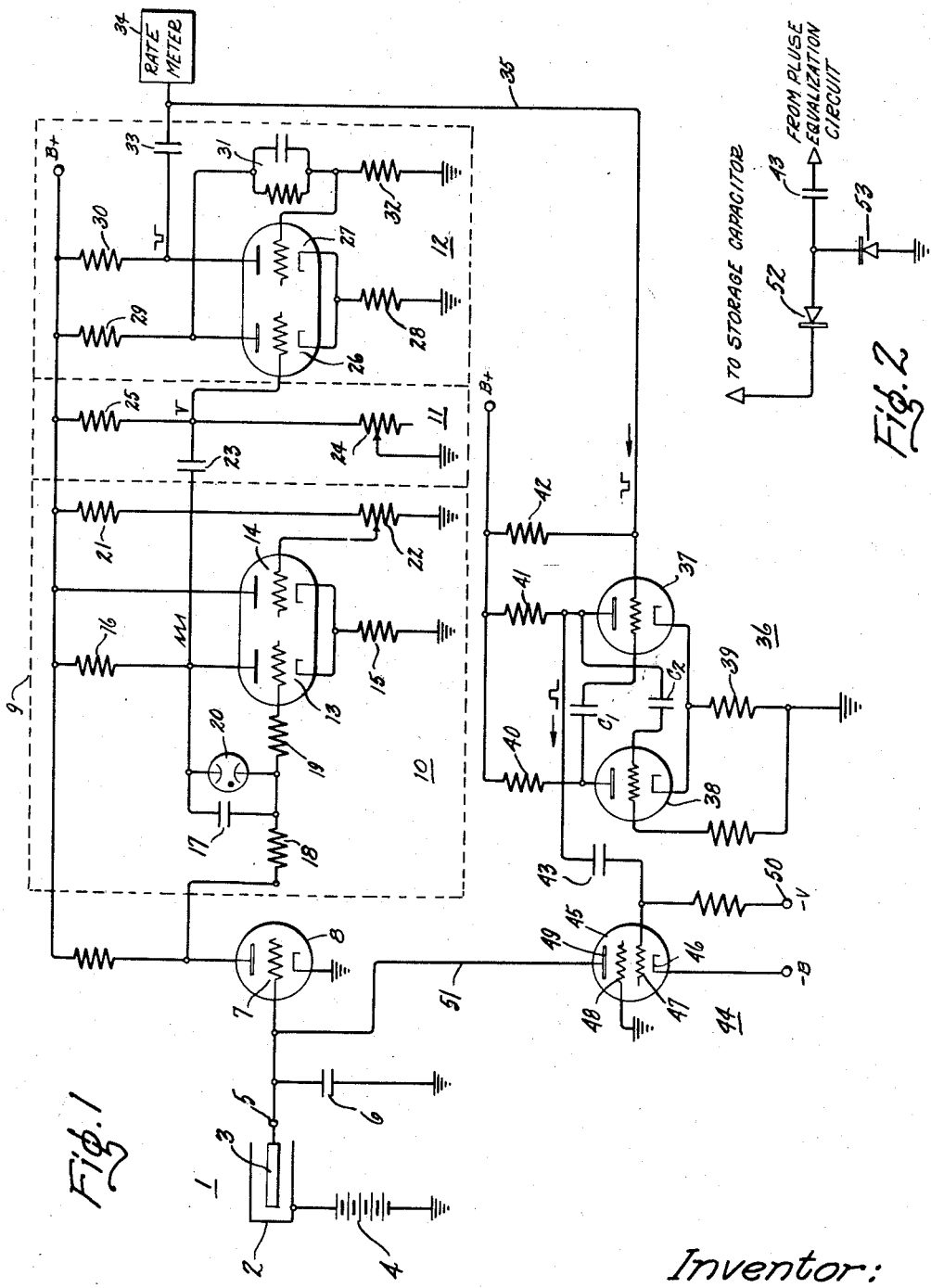
Inventor:
Edmund E. Goodale
by Merton D Morse
His Attorney :

United States Patent Office 2,897,445
Patented July 28, 1959

2,897,445

TIME SERIES CURRENT CONVERSION

Edmund E. Goodale, Schenectady, N.Y., assignor to General Electric Company, a corporation of New York Application August 9, 1957, Serial No. 677,311

4 Claims. (Cl. 324—111)

This invention relates generally to an apparatus for converting direct currents and more particularly to an instrumentality for measuring direct currents by converting them to a series of electrical pulses.

It is an object of this invention to provide a converting apparatus for transforming a direct current into a time series of pulses, the repetition rate of which is proportional to the amplitude of the current. The measurement of direct currents, and especially very small direct currents, has always been plagued by all the myriad difficulties attendant to direct current amplification, such as drift, tube selection, tube deterioration, etc. Consequently, such instruments as are available leave much to be desired in the way of accuracy and sensitivity. The field of reactor instrumentation in particular with the extensive use of logarithmic D.C. amplifiers is especially vunerable to these instrument shortcomings since direct currents of extremely small magnitudes are dealt with. These failings may be easily resolved, according to the teachings of this invention, by converting the direct current into a time series of pulses with a repetition rate proportional to the amplitude of the current to be measured. In this fashion substantially all of the complex problems of D.C. amplification are eliminated.

Another object of this invention is to provide a direct current measuring instrument which utilizes a time series conversion of the direct current.

A further object of this invention is to provide a radiation measuring apparatus wherein an ion chamber current is converted to a time series of pulses, the rate of which is proportional to the ion chamber current.

Yet another object of this invention is to provide an apparatus for measuring very minute direct currents which is not susceptible to drift by converting the currents into electrical pulse trains.

Other objects and advantages of this invention will become apparent as the description of this invention proceeds.

In accordance with one aspect of the invention the above objects are achieved by coupling a direct current source, which in one embodiment may be a radiation measuring means such as an ion chamber, to a storage element, such as a capacitance, which is constantly being charged by the current. The charge level on the capacitance, in turn, controls a generating means which produces a time series of electrical pulses having a repetition rate proportional to the charge level. A feedback circuit continuously compares the pulse rate to the current to be measured by actuating a charge pump which constantly removes charge from the storage element with a fixed increment $q$ being removed by each of the pulses. The system is thus driven to find an equilibrium point where $rq=i_c$, that is, the rate of the pulses, $r$, and the fixed charge removed per pulse, $q$, is made equal to the current flow, $i_c$, to the storage element. Thus, if the current $i_c$ is greater than $rq$, the charge level on the storage element increases, causing an increase in the repetition rate of the pulses whereas if $i_c$ is less than $rq$, the charge level decreases, causing a decrease in the repetition $r$ of the pulses. Thus, the system will always strive for an equilibrium point wherein the rate at which fixed increments of charge are removed by the charge pump always equals the ion chamber current flowing thereto.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing in which:

Figure 1 is a schematic circuit diagram of a direct current time series conversion system; and Figure 2 illustrates an alternative form of a charge pump which may be utilized with the system of Figure 1.

Referring now to Figure 1, there is illustrated a preferred embodiment of the instant invention wherein the numeral 1 denotes a source of direct current which, in the instant case, may be a radiation measuring instrument such as an ion chamber comprising a cylindrical electrode or anode 2 and a centrally disposed collecting electrode or cathode 3. The ion chamber may be filled with argon or any suitable gas that is readily ionized when subjected to penetrative radiation, such as gamma radiation, for example. The cylindrical electrode 2 is maintained at a positive potential by means of a source of potential such as a battery 4 connected therebetween and a source of reference potential such as ground, which potential urges positive ions formed due to penetrative radiation toward the centrally disposed collecting electrode 3 causing an ion current to flow from the electrode 3 to a terminal 5 which may be denominated the input terminal for the time conversion system.

A storage element, such as the capacitance 6, is connected between the terminal 5 and a source of reference potential such as ground and is charged by the input current from the collecting electrode of the ion chamber. The capacitance storage element 6 is connected to the control grid 7 of a D.C. coupled control amplifier 8, of the electrometer type, which amplifies and inverts the voltage appearing across the storage capacitance. The control amplifier 8 does not draw appreciable current but is arranged to have a high amplification factor whereby small variations in the voltage appearing across the storage capacitance 6 have an enhanced effect upon a variable repetition rate pulse generating means presently to be described.

Connected to the output of the control amplifier 8 is a means to produce a time series of pulses having a rate of occurrence which is proportional to the current and positioned within the dashed rectangle indicated generally at 9. The variable repetition rate time series generating means 9 is constituted of a variable frequency saw-tooth generator 10, a differentiating means 11 coupled to the saw-tooth generator for producing negative pulses from the trailing edges of the saw-tooth, and a pulse generator 12 of the mono-stable multivibrator type which is triggered by the negative pulses from the differentiator to produce a square wave pulse train having a repetition rate proportional to the input current.

The variable frequency saw-tooth generator 10 comprises a modified Miller "rundown" circuit and is constituted of triode 13 which is one half of a dual triode having a cathode coupled to a source of reference potential such as ground through a cathode resistance 15 and an anode connected to a source of operating potential such as B+ through an anode resistance 16. The control grid of the triode 13 is connected to the anode of the control amplifier 8 through a pair of series connected resistances 18 and 19. A charging capacitance 17, connected between the anode of triode 13 and the junction of resistance 18 and 19, produces the variable frequency saw-tooth output.

A gaseous discharge device 20, which may typically be a neon bulb, is connected in shunt with the charging capacitance 17 and controls the discharge thereof. The firing rate of the gaseous discharge device 20, and consequently the repetition frequency of the saw-tooth, is determined by the charging of the capacitance 17 through the resistance 18 and through the triode 13. Thus, any variation of the control voltage at the anode of the control amplifier 8 controls the rate at which the capacitance 17 is charged through the resistance 18 and consequently the rate at which the firing or breakdown potential of the gaseous discharge device 20 is approached. Hence, it is clear that variations of the control voltage determine the frequency at which the gaseous tube 20 discharges the charging capacitance 17 and, consequently, the repetition frequency of the saw-tooth voltage.

The triode 14, which is the other half of the dual triode, also has its cathode connected to the resistance 15 and functions as a low impedance control device which establishes the operating parameters for and controls the gain of the triode 13. To this end the control electrode of the triode 14 is connected to the movable tap of a resistance potentiometer 22 which forms, in conjunction with a second series connected resistance 21, a voltage divider connected between a source of operating potential B+ and a source of reference potential such as ground. By adjusting the position of the movable tap on potentiometer 22, the grid bias on the triode 14 is adjusted to draw a predetermined amount of anode current through the cathode resistance 15 establishing the initial cathode and control grid voltage levels for triode 13. As can be seen from the previous description, the triode 13, resistance 18, charging capacitance 17 and gaseous discharge device 20 form a modified Miller "rundown" circuit, the repetition frequency of which is controlled by the voltage appearing at the anode of the control amplifier 8. Thus, a series of positive going saw-tooth voltages, illustrated schematically in Figure 1, appear at the anode of triode 13, the repetition frequency of which is proportional to the amplitude of the current flowing from the ion chamber 1.

The saw-tooth voltages appearing at the anode of the triode 13 are connected by means of a suitable lead to the differentiating circuit 11 comprising a differentiating capacitance 23 and a variable resistance 24 connected as a rheostat and having a grounded movable tap. The resistance 24 constitutes one branch of a voltage divider, the other element of which constitutes a resistance 25 connected between a source of positive potential such as B+ and the junction of the differentiating capacitance and resistance. Differentiating circuit 11, as just described, is utilized to convert the saw-tooth voltage wave produced by the generator 10 into a series of negative triggering pulses of the same frequency by differentiating the trailing edge of the positive saw-tooth (i.e., the fly back) and triggering the pulse generator 12 to produce a square wave pulse train, the repetition rate of which is an index of the ion chamber current.

The pulse generator 12 which is connected as a mono-stable multivibrator is constituted of a pair of triodes 26 and 27 contained in a single envelope and having their cathodes connected to a source of reference potential such as ground through a common cathode resistance 28 and the respective anodes of which are connected to a source of operating potential such as B+ through suitable anode resistances 29 and 30. The anode of the tube 26 is also coupled to the control grid of tube 27 through a regenerative parallel R-C coupling circuit 31 and to a source of reference potential such as ground through a grid leak resistance 32.

The control grid of the triode 26, on the other hand, is connected to the junction of the differentiating capacitance resistance 23 and 24 and consequently has applied to it the negative triggering pulses produced by a differentiating circuit from the saw-tooth voltage wave. The mono-stable, or "one-shot" multivibrator just described has the control grid of the triode 26 returned to a positive potential through the resistance 25 and in its stable state tube 26 is conducting by virtue of this positive grid potential whereas tube 27 is normally non-conducting due to the bias developed across the cathode resistor 28 by the anode current of the tube 26.

The appearance of a negative triggering pulse at the control grid of the normally conducting tube 26 decreases the anode current thereof and causing a corresponding increase in the anode voltage thereof which is coupled to the control grid of the triode 27 through the parallel R-C circuit 31, reversing the conducting states of the two tubes and producing a negative square wave pulse at the anode of the tube 27. A fixed period of time after the reversal of the conductive states of the tubes, a period depending on the values of the parallel R-C circuit 31 and the grid leak resistance 32, the conducting states of the two tubes revert to their original condition; i.e., triode 26 conducting and triode 27 non-conducting, until the appearance of the next negative triggering pulse from the differentiating circuit 11 at which time the previously described sequence of operation is again initiated to produce another negative square wave pulse.

In this fashion there is produced at the output of the pulse generator 12 a train of square wave negative going pulses, the repetition rate of which is the same as that of the saw-tooth voltage wave train produced by the saw-tooth generator 10 and, consequently, proportional to the amplitude of the ion chamber current.

The anode of the triode 27 is connected through a coupling capacitance 33 to a means to measure the output repetition rate as an index of the current magnitude. To this end a rate meter indicated generally in block diagram form at 34 is connected to the output of the pulse generating means which, as is well known to those skilled in the art, produces an indication of the rate of occurrence or repetition frequency of the pulse train. The output of the rate meter may be calibrated directly in terms of the ion chamber current or current source which is being measured.

It is understood, of course, that any sort of rate meter may be utilized, there being many available. For example, in the nuclear reactor instrumentation field it may be desirable to utilize a logarithmic counting rate meter with the instant time conversion apparatus to produce the functional equivalent of a logarithmic D.C. amplifier desirable in this type of instrumentation.

There is provided a means to remove fixed increments of charge from said storage means at a rate determined by the current induced charge level on the storage means whereby an equilibrium condition is achieved wherein the charge removed from the storage means exactly equals the charge added to the storage means by the current to be measured. There is provided a feedback means from the output of the pulse producing means 9 to the storage means which includes a charge pump, illustrated generally at 44, which is actuated in response to each of the individual pulses of the pulse train to remove a fixed increment of charge from the storage means. To this end the output pulses from the pulse means 9 are taken by means of a suitable lead 35 to a pulse equalizing circuit 36 for shaping the pulses and regulating their height and duration. The pulse equalizing and shaping means 36 comprises a "one-shot" or mono-stable multivibrator with a positive grid return and include a pair of cathode coupled triodes 37 and 38 having their cathodes connected to a source of reference potential through a common cathode resistance 39 and their respective anodes to a source of operating potential such as B+ to a pair of suitable anode resistances 40 and 41. The anodes and control grids of the respective triodes are regeneratively coupled by means of capacitances $C_1$ and $C_2$ while the control grid of the tube 37 is additionally connected to a source of positive potential through the grid return resistance 42 which is connected to the source of potential B+ and thus maintains the control grid of that tube at a slightly positive potential.

As is well known to those skilled in the art, the tube 37 is conducting in the stable condition by virtue of the positive grid return through resistance 42 whereas the tube 38 is non-conducting due to the bias developed in the common cathode resistance 39. Upon the appearance of a negative pulse upon the lead 35, in the manner customary to such devices, the conducting state of the two tubes are reversed with the tube 37 becoming non-conducting and tube 38 becoming conducting. The circuit remains in this condition as long as the discharge of $C_1$ maintains a sufficiently negative potential on the grid of 37 to keep the tubes cut off. When $C_1$ has discharged sufficiently the tubes revert to their original stable state with the triode 38 non-conducting and the triode 37 conducting until the appearance of the next negative pulse from the output of the generating means 9. Thus, a series of shaped constant amplitude and constant duration positive pulses appear at the anode of tube 37, one for each of the negative pulses appearing at the output terminal of the pulse generating means 9.

The positive pulses appearing at the anode of the triode 37 of the pulse equalization means 36 actuate a charge pump which removes a fixed increment of charge from the storage element 6 for each of the positive pulses. Hence, the anode of the tube 37 is coupled through a coupling capacitance 43 to a charge pump indicated generally at 44 which comprises a normally non-conducting constant current tetrode 46. The tetrode 46 has a cathode element 47, a control electrode 48, a screen electrode 49, and an anode 50. The cathode 47 is connected to a source of negative potential with respect to ground such as B— whereas the control electrode 48 is connected to a source of negative bias potential at a terminal 50 and identified by the legend —V, which normally maintains the tube in a non-conducting condition. The screen electrode is connected to a source of reference potential such as ground while the anode is connected by a lead 51 directly to the upper or positive plate of storage means 6.

As is well known, multi-element tubes such as tetrodes are unaffected by variations of anode voltage so that substantially constant anode current flows. Thus, tube elements of this type act as constant current devices since for a given control electrode bias voltage a substantially fixed anode current flows irrespective of variations in the anode voltage.

In the instant apparatus, the control grid 47 of the charge pump is biased so as to maintain the tube in the cut-off condition in the absence of a positive pulse from the pulse equalizing circuit 36. Upon the appearance of the positive pulse, which has constant height and duration, the negative bias on the control grid 47 is overcome and the tube conducts removing a fixed amount of charge $q$ from the storage element 6. Thus, upon the occurrence of each individual pulse of the pulse train produced by the means 9 a fixed charged increment $q$ is removed from the storage element.

Now, if the rate of occurrence of the pulse train thus produce is made to equal $r$, an arbitrary number for the purposes of explanation, the amount of charge removed per unit time equals $rq$. If the current $i_c$ flowing from the collector electrode 3 of the ion chamber 1 deposits charge in the storage means 6 at a faster rate than the rate at which charge is being removed from the capacitance by the charge pump, it can be seen that the charge level on the capacitance 6 rises and, consequently, increases the repetition rate $r$ of the pulse train produced by the pulse producing means 9. As a consequence of this increase of the rate $r$, the value of the term $rq$; i.e., the amount of charge removal by the charge pump 44, goes up until it equals the amount of charge deposited in the capacitance 6 by the ion chamber. Conversely, should the ion chamber current decrease in magnitude the charge level on the capacitance 6 is diminished reducing the repetition rate of the pulse train and reducing the value of the term $rq$ until once again the rate of charge removal from the capacitance equals the rate of charge deposition by the ion chamber current.

Thus, it can be seen that the system is constrained to find an equalibrium point where $rq=i_c$ and a self-correcting very stable, and highly sensitive instrument is available. By examining the equation $rq=i_c$ it can be seen that for any value of $i_c$ there will be a corresponding rate $r$ of charge removal which will produce equilibrium conditions. Thus, clearly, the pulse rate $r$ produced by the pulse producing means 9 is proportional to the amplitude of the ion chamber current $i_c$ and may be utilized as an index thereof.

In discussing the charge pump 44, a tetrode 46 has been illustrated and described as the constant current device which removes fixed increments of charge. It is obvious, of course, that a pentode may be used with equal success and may, in fact, be preferable because of its generally more linear anode characteristics.

Figure 2 illustrates an alternative construction for the charge pump of the system of Figure 1 which utilizes a pair of diode elements in place of the constant current tetrode of Figure 1. A diode member 52 having its cathode element connected by a suitable lead 51 to the storage element, such as the capacitance 6 illustrated in Figure 1, and has its anode element connected to the coupling capacitance 43 which is in turn connected to the pulse equalization circuit 36. A second diode element 53 has its cathode connected to the junction of the coupling capacitance 43 and the diode 52 and its anode element connected to a source of reference potential such as ground.

The two-diode charge pump operates in essentially the same manner as does that illustrated in Figure 1; that is, the diode 52 is normally biased well beyond cut-off and is made conductive to remove a fixed increment of charge from the storage element only upon the arrival of a positive pulse from the pulse equalization circuit 36. That is, only in the presence of a positive pulse is the anode element of the diode 52 made sufficiently positive to permit conduction and removal of charge. The second diode element 53 is utilized to insure that the increment of charge removed from the storage element does not depend upon the pulse duration of the pulses from equalization circuit 36. Thus, it can be seen that the two diode charge pump assemblies illustrated in Figure 2 may be used equally well with the system of Figure 1. In addition, it should be noted that in the charge pump illustrated in Figure 2, the diodes are so poled as to be actuated by the appearance of positive pulses from the pulse equalization circuit. However, it is obvious that if it is desirable to use negative pulses the same effect may be achieved merely by reversing the polarity of the diodes 52 and 53.

Similarly, it is obvious that in certain circumstances it may be desirable to eliminate the pulse equalization circuit 36 entirely. That is, when utilizing a two-diode circuit as a charge pump, it may be possible in the situation when the diodes are so poled as to be actuated in response to negative pulses, to utilize the output directly from the pulse generator 12. The desirability of such a modification will depend on the particular circumstances of use; i.e., whether the output pulses from the generator 12 have sufficient integrity, in terms of pulse height and pulse duration, to be useable with accurate results.

While a particular embodiment of this invention has been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. In a converting apparatus for producing a series of pulses having a repetition rate dependent upon the magnitude of a unidirectional current, the combination comprising a storage capacitor charged by the unidirectional current to be converted, means to produce a series of pulses having a repetition rate proportional to said current, said means including a generating means for generating a series of pulses of a rate varying in response to the instantaneous charge level on said capacitor, discharge means actuated by said pulse generating means to discharge said capacitor partially by removing fixed increments of charge from said capacitor at the repetition rate of said series of pulses until equilibrium is achieved and the charge removed equals the charge deposited by said unidirectional current and the repetition rate is a measure of said current.

2. In an apparatus for producing a series of pulses having a repetition rate dependent upon the magnitude of a unidirectional current, the combination of a storage capacitor adapted to be charged by said unidirectional current, means coupled to said storage capacitor to produce a series of output pulses in response to said current, said means including pulse generating means for generating a series of pulses the repetition rate of which is varied in response to the instantaneous charge level on said capacitor, means responsive to each pulse of said series to discharge said capacitor partially by a fixed amount until equilibrium is achieved and the discharge of said capacitor equals the charge due to said unidirectional current, said means including a normally closed discharge path across said capacitor; and means responsive to each pulse of said series to open said path for the duration of the pulse.

3. In an apparatus for producing a series of pulses having a repetition rate dependent upon the magnitude of a unidirectional current, the combination of a storage capacitor adapted to be charged by said unidirectional current, means coupled to said storage means to produce a series of output pulses in response to said current including pulse generating means for generating a series of pulses the repetition rate of which is varied in response to the instantaneous charge level on said capacitor, means responsive to each pulse from said pulse generating means to discharge said capacitor partially by fixed increments said means including a charge removal pump periodically actuated by said pulse series until equilibrium is achieved and the charge removed is equal to the charge deposited by said current, and means to measure the repetition rate of the pulse series as an index of the current magnitude.

4. The combination in an apparatus for producing a series of pulses having a repetition rate dependent upon the magnitude of a unidirectional current, of a storage capacitor adapted to be charged by said unidirectional current to a level representative of said current, means coupled to said storage capacitor to generate a series of pulses, the repetition rate of said pulse series being controlled by the instantaneous charge level on said storage means, said last named means including a free running variable frequency generating means for producing repetitive time varying voltages, and pulse generating means responsive to said time varying voltages to produce an output pulse for each of said time varying voltages, and means responsive to each output pulse to discharge said capacitor partially by removing a fixed increment of charge therefrom until equilibrium is achieved and the charge removed equals the charge deposited by said unidirectional current whereby the repetition rate of that pulse series is a measure of magnitude of said current.

References Cited in the file of this patent

UNITED STATES PATENTS 2,615,063    Brown    Oct. 21, 1952